United States Patent
Fradette et al.

(10) Patent No.: US 9,480,949 B2
(45) Date of Patent: *Nov. 1, 2016

(54) PROCESS FOR DESORBING $CO_2$ CAPTURE FROM ION-RICH MIXTURE WITH MICRO-PARTICLES COMPRISING BIOCATALYSTS

(71) Applicant: CO2 SOLUTIONS INC., Québec (CA)

(72) Inventors: Sylvie Fradette, Pintendre (CA); Julie Gingras, Québec (CA); Norman Voyer, Neuville (CA); Jonathan Carley, Etobicoke (CA); Glenn R. Kelly, Trois-Rivières (CA); Olivera Ceperkovic, Québec (CA)

(73) Assignee: CO2 Solutions Inc., Quebec (CA)

( * ) Notice: Subject to any disclaimer, the term of this patent is extended or adjusted under 35 U.S.C. 154(b) by 254 days.

This patent is subject to a terminal disclaimer.

(21) Appl. No.: 14/458,779

(22) Filed: Aug. 13, 2014

(65) Prior Publication Data

US 2014/0349366 A1 Nov. 27, 2014

Related U.S. Application Data

(62) Division of application No. 13/264,294, filed as application No. PCT/CA2010/001213 on Aug. 4, 2010, now Pat. No. 8,846,377.

(60) Provisional application No. 61/231,038, filed on Aug. 4, 2009.

(51) Int. Cl.
*A61L 9/01* (2006.01)
*B01D 53/96* (2006.01)
(Continued)

(52) U.S. Cl.
CPC ........... *B01D 53/96* (2013.01); *B01D 53/1425* (2013.01); *B01D 53/1475* (2013.01);
(Continued)

(58) Field of Classification Search
CPC ....... C23C 24/08; C23C 26/00; C23C 30/00; C23C 4/10; B01D 2251/306; B01D 2251/606; B01D 2252/20405; B01D 2252/20431; B01D 2252/20489; B01D 2252/20494; B01D 2252/205; B01D 2252/504; B01D 2252/602; B01D 2255/804; B01D 2257/504; B01D 53/1425; B01D 53/1493; B01D 53/62; B01D 53/83; B01D 53/96; Y02C 10/04; Y02C 10/06
USPC ............ 435/168, 174, 200, 209.1, 232, 262, 435/266, 299.1, 300.1; 423/220, 432; 60/39.5
See application file for complete search history.

(56) References Cited

U.S. PATENT DOCUMENTS

| | | |
|---|---|---|
| 4,376,101 A | 3/1983 | Sartori et al. |
| 5,618,710 A | 4/1997 | Navia et al. |

(Continued)

FOREIGN PATENT DOCUMENTS

| | | |
|---|---|---|
| EP | 1521629 B1 | 2/2007 |
| EP | 1377531 B1 | 7/2007 |

(Continued)

OTHER PUBLICATIONS

Graf G., (1966), Regenerative control of $CO_2$ in air by carbonic anhydrase, Technical Report No. AFFDL-TR-66-62, Youngstown University, Department of Chemistry.

(Continued)

*Primary Examiner* — Michael Marcheschi
*Assistant Examiner* — Shanta G Doe
(74) *Attorney, Agent, or Firm* — Myers Bigel & Sibley, P.A.

(57) ABSTRACT

A process for desorbing $CO_2$ gas from an ion-rich aqueous mixture comprising bicarbonate and hydrogen ions, includes providing micro-particles in the ion-rich aqueous mixture; and feeding the ion-rich aqueous mixture into a desorption reactor; the micro-particles comprising a support material and biocatalysts supported and stabilized by the support material and being sized and provided in a concentration in the desorption reactor such that the micro-particles are carried with the ion-rich aqueous mixture to promote transformation of the bicarbonate and hydrogen ions into $CO_2$ gas and water, thereby producing a $CO_2$ gas stream and an ion-depleted solution.

21 Claims, 4 Drawing Sheets

(51) Int. Cl.
  *B01D 53/14* (2006.01)
  *B01D 53/62* (2006.01)
  *C01B 31/20* (2006.01)
  *B01D 53/83* (2006.01)

(52) U.S. Cl.
  CPC .......... *B01D53/1493* (2013.01); *B01D 53/62* (2013.01); *C01B 31/20* (2013.01); *B01D 53/83* (2013.01); *B01D 2251/306* (2013.01); *B01D 2251/606* (2013.01); *B01D 2252/205* (2013.01); *B01D 2252/20405* (2013.01); *B01D 2252/20431* (2013.01); *B01D 2252/20489* (2013.01); *B01D 2252/20494* (2013.01); *B01D 2252/504* (2013.01); *B01D 2252/602* (2013.01); *B01D 2255/804* (2013.01); *B01D 2257/504* (2013.01); *Y02C 10/04* (2013.01); *Y02C 10/06* (2013.01)

(56) References Cited

U.S. PATENT DOCUMENTS

| | | |
|---|---|---|
| 6,143,556 A | 11/2000 | Trachtenberg |
| 6,475,382 B2 | 11/2002 | Parent |
| 6,524,843 B1 | 2/2003 | Blais et al. |
| 6,602,703 B2 | 8/2003 | Dutil |
| 6,846,584 B2 | 1/2005 | Dutil et al. |
| 6,908,507 B2 | 6/2005 | Lalande et al. |
| 7,514,056 B2 | 4/2009 | Fradette et al. |
| 7,521,217 B2 | 4/2009 | Daigle et al. |
| 7,596,952 B2 | 10/2009 | Fradette et al. |
| 7,642,076 B2 | 1/2010 | Dziedzic et al. |
| 7,740,689 B2 | 6/2010 | Fradette et al. |
| 7,964,170 B2 | 6/2011 | Singh |
| 7,998,714 B2 | 8/2011 | Gellett et al. |
| 8,945,826 B2 * | 2/2015 | Borchert ............. B01D 53/62 435/4 |
| 2001/0022952 A1 | 9/2001 | Rau et al. |
| 2003/0143719 A1 | 7/2003 | Dutil et al. |
| 2003/0224504 A1 | 12/2003 | Blais et al. |
| 2006/0048517 A1 | 3/2006 | Fradette et al. |
| 2006/0213224 A1 | 9/2006 | Fradette et al. |
| 2006/0246564 A1 | 11/2006 | Parent et al. |
| 2007/0004023 A1 | 1/2007 | Trachtenberg |
| 2007/0048856 A1 | 3/2007 | Parent et al. |
| 2007/0128713 A1 | 6/2007 | Parent et al. |
| 2009/0007779 A1 | 1/2009 | Coignet et al. |
| 2009/0136827 A1 | 5/2009 | Minteer et al. |
| 2009/0155889 A1 | 6/2009 | Handagama et al. |
| 2010/0092359 A1 | 4/2010 | Svendsen et al. |
| 2010/0135882 A1 | 6/2010 | Constantz et al. |
| 2010/0209968 A1 | 8/2010 | Akers et al. |
| 2010/0209997 A1 | 8/2010 | Newman et al. |
| 2010/0267123 A1 | 10/2010 | Wibberley |
| 2011/0223650 A1 | 9/2011 | Saunders et al. |
| 2011/0269205 A1 | 11/2011 | Su et al. |
| 2012/0003722 A1 | 1/2012 | Polak et al. |

FOREIGN PATENT DOCUMENTS

| | | |
|---|---|---|
| WO | WO 96/40414 A1 | 12/1996 |
| WO | WO 2004/056455 A1 | 7/2004 |
| WO | WO 2006/089423 A1 | 8/2006 |
| WO | WO 2008/072979 A1 | 6/2008 |
| WO | WO 2008/137846 A2 | 11/2008 |
| WO | WO/2010/014773 * | 4/2010 |

OTHER PUBLICATIONS

Lacroix O., (2008), $CO_2$ Capture using immobilized carbonic anhydrase in robinson-mahoney basket and packed absorption column reactors, Laval University, Department of Chemical Engineering, Quebec.
Alper, E et al., "Gas absorption Mechanism in Catalytic Slurry Reactors", Chem. Eng. Sci., 1980, vol. 35 pp. 217-222.
Danckwerts, P.V., "The absorption of gases in liquids", Pure Appl. Chem., 1965, vol. 10, No. 4, pp. 625-642.
Sloley, A et al., "Subdue solids in towers" Chemical Engineering Progress, 1995, pp. 64-73.
Alper et al., "Comparison of effective interfacial areas with the actual contact area for gas absorption in a stirred cell", Chemical Engineering Science, vol. 35, pp. 1263-1268.
Alper et al., "Comments on "Gas absorption with catalytic reaction"", Chemical Engineering Science, vol. 36, pp. 1097-1099.
Kohl et al, "Principal of Absorption" Gas Purification—Fifth Edition,1997, p. 6, Texas, United States of America.
Cussler, "Absorption Equipment" Diffusion Mass Transfer in Fluid Systems—Third edition, 2009, Section 9.2, Cambridge University Press.
Burk, D., On the use of carbonic anhydrase in carbonate and amine buffers for CO2 exchange in manometric vessels, atomic submarines, and industrial CO2 scrubbers, Ann N Y Acad Sci, vol. 92, p. 372-400, 1961.
McConnaughey, W.E., Submarine atmosphere control, Closed Circuit Respiratory Systems Symposium, WADD Technical Report 60-574, 1960.
Hobbie et al., Intermediate Physics for Medecine and Biology, 4th edition, p. 2, 2007.
Demir et al., Purification and characterization of carbonic anhydrase from human erythrocyte plasma membrane, Turk J Med Sci, vol. 31, p. 477-482, 2001.
Silverman, D.N., Proton transfer in carbonic anhydrase measured by equilibrium isotope exchange, Methods in Enzymology, vol. 249, p. 479, 1995.
US Environmental Protection Agency, Sulfur Oxides Control Technology Series: Flue Gas Desulfurization—Lime/Limestone Processes, EPA Summary Report No. 625/8-81-006, Apr. 1981.
Henzel et al., Limestone FGD Scrubbers: User's Handbook, EPA Report No. 600/8-81-017, p. 3-9,3-12 and 3-13, 1981.
Khalil et al., Simultaneous removal of SO2 and CO2 from flue gases at large coal-fired stationary sources, OLI's 24th User Conference, Oct. 2007.
International Search Report corresponding to PCT/CA2010/001213 mailed Nov. 10, 2010.
Written Opinion of the International Searching Authority corresponding to PCT/CA2010/001213 mailed Nov. 10, 2010.

* cited by examiner

PROCESS FOR DESORBING CO₂ CAPTURE FROM ION-RICH MIXTURE WITH MICRO-PARTICLES COMPRISING BIOCATALYSTS

RELATED APPLICATIONS

This application is a divisional of U.S. patent application Ser. No. 13/264,294, filed on Oct. 13, 2011, now allowed and issued as U.S. Pat. No. 8,846,377, which is a 35 U.S.C. §371 national stage application of PCT Application No. PCT/CA2010/001213, filed on Aug. 4, 2010, which claims priority from U.S. Provisional Application No. 61/231,038 filed on Aug. 4, 2009, the contents of which are incorporated herein by reference in their entireties. The above-referenced PCT International Application was published as International Publication No. WO 2011/014956 A1 on Feb. 10, 2011.

FIELD OF THE INVENTION

The present invention relates generally to $CO_2$ capture and more particularly to a process for $CO_2$ capture using micro-particles comprising biocatalysts.

BACKGROUND

Increasingly dire warnings of the dangers of climate change by the world's scientific community combined with greater public awareness and concern over the issue has prompted increased momentum towards global regulation aimed at reducing man-made greenhouse gas (GHGs) emissions, most notably carbon dioxide. Ultimately, a significant cut in North American and global $CO_2$ emissions will require reductions from the electricity production sector, the single largest source of $CO_2$ worldwide. According to the International Energy Agency's (IEA) GHG Program, as of 2006 there were nearly 5,000 fossil fuel power plants worldwide generating nearly 11 billion tons of $CO_2$, representing nearly 40% of total global anthropogenic $CO_2$ emissions. Of these emissions from the power generation sector, 61% were from coal fired plants. Although the long-term agenda advocated by governments is replacement of fossil fuel generation by renewables, growing energy demand, combined with the enormous dependence on fossil generation in the near to medium term dictates that this fossil base remain operational. Thus, to implement an effective GHG reduction system will require that the $CO_2$ emissions generated by this sector be mitigated, with carbon capture and storage (CCS) providing one of the best known solutions.

The CCS process removes $CO_2$ from a $CO_2$ containing flue gas, enables production of a highly concentrated $CO_2$ gas stream which is compressed and transported to a sequestration site. This site may be a depleted oil field or a saline aquifer. Sequestration in ocean and mineral carbonation are two alternate ways to sequester that are in the research phase. Captured $CO_2$ can also be used for enhanced oil recovery.

Current technologies for $CO_2$ capture are based primarily on the use of amine solutions which are circulated through two main distinct units: an absorption tower coupled to a desorption (or stripping) tower.

Biocatalysts have been used for $CO_2$ absorption applications. For example, $CO_2$ transformation may be catalyzed by the enzyme carbonic anhydrase as follows:

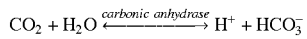

$$CO_2 + H_2O \xrightleftharpoons{\text{carbonic anhydrase}} H^+ + HCO_3^-$$

Under optimum conditions, the catalyzed turnover rate of this reaction may reach $1 \times 10^6$ molecules/second.

There are some known ways of providing carbonic anhydrase in $CO_2$ capture reactors. One way is by immobilising the enzyme on a solid packing material in a packed tower reactor. Another way is by providing the enzyme in a soluble state in a solution within or flowing through a reactor. Both of these methods provide benefits but also some limitations. Enzyme immobilized on a solid packing material limits the enzyme benefit since it has a limited presence in the thin reactive liquid film at the gas-liquid interface which has a thickness of about 10 μm; enzyme on packing is several millimeters from the gas-liquid interface. Soluble enzyme brings the optimal enzyme impact, however it cannot be easily separated from the solution and if the enzyme is not robust to intense conditions such as those used in desorption operations, it will be denatured and the process will require high levels of continuous enzyme replacement.

There is a need for a technology that overcomes some of these problems and challenges of the known techniques for providing biocatalysts such as carbonic anhydrase in $CO_2$ capture reactors.

SUMMARY OF THE INVENTION

The present invention responds to the above mentioned need by providing a process for $CO_2$ capture using micro-particles comprising biocatalysts.

More particularly, the present invention provides a process for capturing $CO_2$ from a $CO_2$-containing gas comprising contacting the $CO_2$-containing gas with an absorption mixture within a packed reactor, the absorption mixture comprising a liquid solution and micro-particles, the micro-particles comprising a support material and biocatalysts supported by the support material and being sized and provided in a concentration such that the absorption mixture flows through the packed reactor and that the micro-particles are carried with the liquid solution to promote dissolution and transformation of $CO_2$ into bicarbonate and hydrogen ions, thereby producing a $CO_2$-depleted gas and an ion-rich mixture comprising the micro-particles.

In one optional aspect, the process comprises removing the micro-particles from the ion-rich mixture to produce an ion-rich solution. In another optional aspect, the removing of the micro-particles is performed by filtration mechanism, magnetic separation, centrifugation, cyclone, sedimentation or a combination thereof.

In another optional aspect, the process comprises performing desorption or mineral carbonation on the ion-rich solution to produce an ion-depleted solution. The ion-rich mixture may comprise precipitates and the precipitates may be removed from the ion-rich mixture prior to performing the desorption or the mineral carbonation.

In another optional aspect, the process comprises adding an amount of the micro-particles to the ion-depleted solution before recycling the ion-depleted solution for further contacting the CO2-containing gas.

In another optional aspect, the process comprises feeding the ion-rich mixture into a desorption reactor, the micro-particles being stabilized by the support material and being sized and provided in a concentration in the desorption reactor such that the micro-particles are carried with the ion-rich mixture to promote transformation of the bicarbonate and hydrogen ions into $CO_2$ gas and water, thereby producing a $CO_2$ gas stream and the ion-depleted solution.

In another optional aspect, the micro-particles may be sized to facilitate separation of the micro-particles from the ion-rich mixture. For instance, the micro-particles may be sized to have a diameter above about 1 µm or above about 5 µm.

In another optional aspect, the micro-particles may be sized to have a catalytic surface area comprising the biocatalysts having an activity density so as to provide an activity level equivalent to a corresponding activity level of soluble biocatalysts above about 0.05 g biocatalyst/L, optionally between about 0.05 g biocatalyst/L and about 2 g biocatalyst/L, and preferably between about 0.05 g biocatalyst/L and about 0.5 g biocatalyst/L, for the case of biocatalysts having a minimum activity of about 260 WA units/mg.

In another optional aspect, the absorption mixture and the $CO_2$ form a reactive liquid film having a thickness and the micro-particles are sized so as to be within an order of magnitude of the thickness of the reactive liquid film. In another optional aspect, the absorption mixture and the $CO_2$ form a reactive liquid film having a thickness and the micro-particles are sized so as to be smaller than the thickness of the reactive liquid film. The thickness of the reactive liquid film may be about 10 µm.

In another optional aspect, the micro-particles are sized between about 1 µm and about 100 µm.

In another optional aspect, precipitates may be formed in the ion-rich mixture and the micro-particles may be sized to be larger or heavier than the precipitates.

In another optional aspect, the micro-particles have an activity density of at least about 0.06 WA/mm$^2$, optionally of about 0.5 WA/mm$^2$ or more.

In another optional aspect, the micro-particles are provided in the absorption mixture at a maximum particle concentration of about 40% w/w. In some optional aspects, the maximum micro-particle concentration may be 35% w/w, 30% w/w, 25% w/w, 20% w/w, 15% w/w, 10% w/w, or 5% w/w.

In another optional aspect, the support material is at least partially composed of nylon, cellulose, silica, silica gel, chitosan, polystyrene, polymethylmetacrylate, magnetic material, or a combination thereof. The support may preferably be composed of nylon.

In another optional aspect, the density of the support material may be between about 0.6 g/ml and about 3 g/ml.

In another optional aspect, the absorption mixture comprises water and an absorption compound. The absorption compound may comprise primary, secondary and/or tertiary amines; primary, secondary and/or tertiary alkanolamines; primary, secondary and/or tertiary amino acids; and/or carbonates. More particularly, the absorption compound may comprise piperidine, piperazine, derivatives of piperidine or piperazine which are substituted by at least one alkanol group, monoethanolamine (MEA), 2-amino-2-methyl-1-propanol (AMP), 2-(2-aminoethylamino)ethanol (AEE), 2-amino-2-hydroxymethyl-1,3-propanediol (Tris), N-methyldiethanolamine (MDEA), dimethylmonoethanolamine (DMMEA), diethylmonoethanolamine (DEMEA), triisopropanolamine (TIPA), triethanolamine, dialkylether of polyalkylene glycols, dialkylether or dimethylether of polyethylene glycol, amino acids comprising glycine, proline, arginine, histidine, lysine, aspartic acid, glutamic acid, methionine, serine, threonine, glutamine, cysteine, asparagine, valine, leucine, isoleucine, alanine, valine, tyrosine, tryptophan, phenylalanine, and derivatives such as taurine, N, cyclohexyl 1,3-propanediamine, N-secondary butyl glycine, N-methyl N-secondary butyl glycine, diethylglycine, dimethylglycine, sarcosine, methyl taurine, methyl-α-aminopropionic acid, N-(β-ethoxy)taurine, N-(β-aminoethyl)taurine, N-methyl alanine, 6-aminohexanoic acid and potassium or sodium salts of the amino acids; potassium carbonate, sodium carbonate, ammonium carbonate, promoted potassium carbonate solutions and promoted sodium carbonate solutions or promoted ammonium carbonates; or mixtures thereof.

In another optional aspect, the biocatalysts are enzymes. The enzymes are preferably carbonic anhydrase. The carbonic anhydrase may be immobilized on a surface of the support material of the micro-particles, entrapped within the support material of the micro-particles, or a combination thereof. In another optional aspect, the carbonic anhydrase may also be provided as cross-linked enzyme aggregates (CLEAs) and the support material comprises a portion of the carbonic anhydrase and crosslinker. In still another optional aspect, the carbonic anhydrase is provided as cross-linked enzyme crystals (CLECs) and the support material comprises a portion of the carbonic anhydrase.

In another optional aspect, the process comprises selecting a desired biocatalytic activity level; determining a maximum allowable particle concentration for the packed reactor; determining a total surface area required to reach the biocatalytic activity level; determining a total volume of the micro-particles to reach the maximum; and determining a maximum size of the micro-particles to achieve the biocatalytic activity level with the maximum allowable particle concentration.

The invention also provides a process for capturing $CO_2$ from a $CO_2$-containing gas comprising contacting the $CO_2$-containing gas with an absorption mixture comprising a liquid solution and micro-particles, the micro-particles comprising a support material and biocatalysts supported by the support material and being sized and provided in a concentration such that the absorption mixture is pumpable and that the micro-particles are carried with the liquid solution to promote dissolution and transformation of $CO_2$ into bicarbonate and hydrogen ions, thereby producing a $CO_2$-depleted gas and an ion-rich mixture comprising the micro-particles.

In one optional aspect of this process, contacting the absorption mixture with the $CO_2$-containing gas is performed in an absorption stage comprising at least one reactor selected from a packed tower, a spray tower, a fluidized bed reactor and a combination thereof.

In various other optional aspects of this process, the features as mentioned in the previous paragraphs may also be used.

The invention also provides a process for desorbing $CO_2$ gas from an ion-rich aqueous mixture comprising bicarbonate and hydrogen ions, comprising: providing micro-particles in the ion-rich aqueous mixture; feeding the ion-rich aqueous mixture into a desorption reactor; the micro-particles comprising a support material and biocatalysts supported and stabilized by the support material and being sized and provided in a concentration in the desorption reactor such that the micro-particles are carried with the ion-rich aqueous mixture to promote transformation of the bicarbonate and hydrogen ions into $CO_2$ gas and water, thereby producing a $CO_2$ gas stream and an ion-depleted solution.

The present invention also provides micro-particles for introduction into a liquid solution for capturing $CO_2$ from a $CO_2$-containing gas. The micro-particles may have optional features and uses as described for the optional aspects of the process herein.

The present invention also provides a system for capturing $CO_2$ from a $CO_2$-containing gas. The system comprises an absorption unit comprising a gas inlet for the $CO_2$-containing gas, a liquid inlet for providing an absorption mixture comprising a liquid solution and micro-particles comprising a support material and biocatalysts supported thereby. The system comprises a reaction chamber for allowing the micro-particles to be carried with the liquid solution to enable dissolution and transformation of $CO_2$ into bicarbonate and hydrogen ions, thereby producing a $CO_2$-depleted gas and an ion-rich mixture containing the micro-particles. The system comprises a gas outlet for expelling the $CO_2$-depleted gas and a liquid outlet for expelling the ion-rich mixture containing the micro-particles. Optionally, the system may comprise a removal unit for removing the micro-particles from the ion-depleted mixture and producing an ion-rich solution; a regeneration unit for receiving the ion-rich solution and allowing desorption or mineral carbonation by releasing the bicarbonate ions from the ion-rich solution to produce an ion-depleted solution; and an addition unit for adding the micro-particles to the ion-depleted solution before the same is recycled back into the liquid inlet of the absorption unit. The system may have optional features as described for the optional aspects of the process herein.

Managing and coordinating the size, concentration and biocatalytic activity of the micro-particles allows advantageous operation in $CO_2$ capture processes.

DESCRIPTION OF PREFERRED EMBODIMENTS

Figure 1:
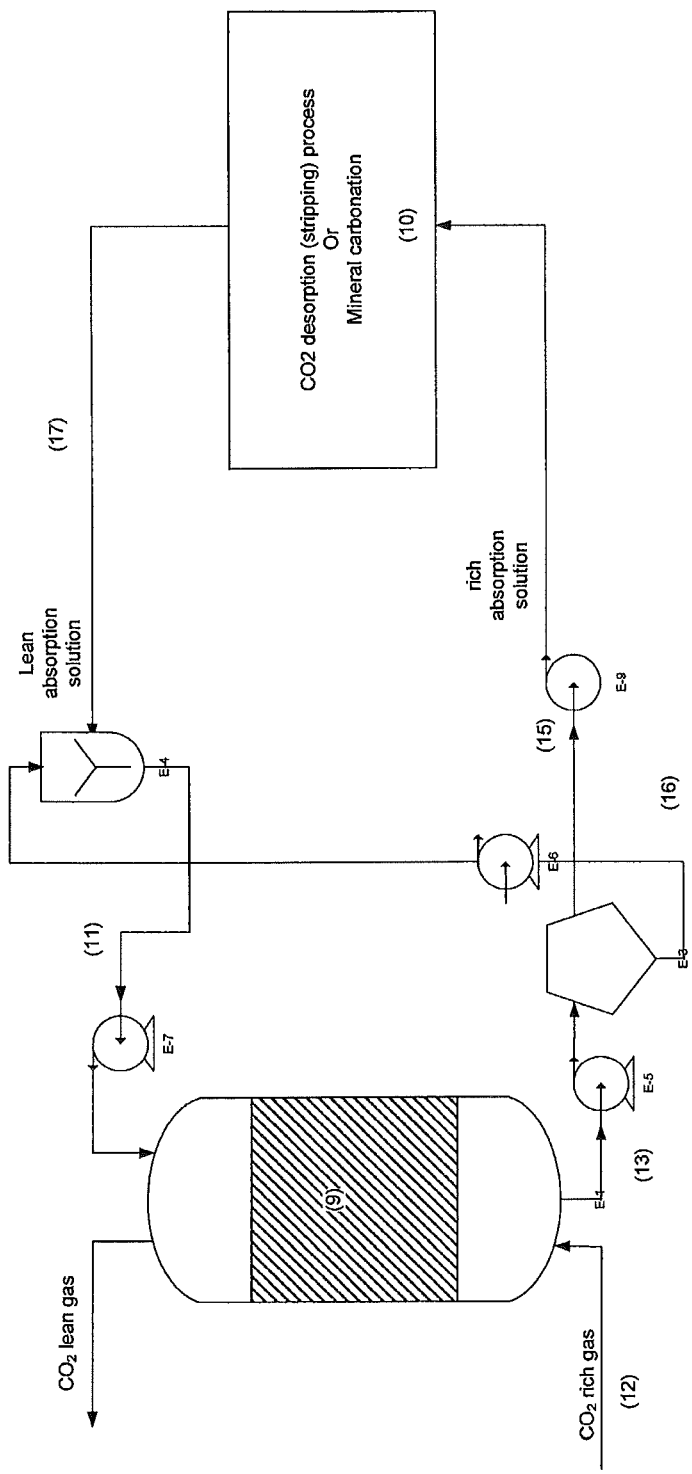
FIG. 1 is a process diagram of an embodiment of the present invention, wherein biocatalytic micro-particles flow in the absorption solution.
Figure 2:
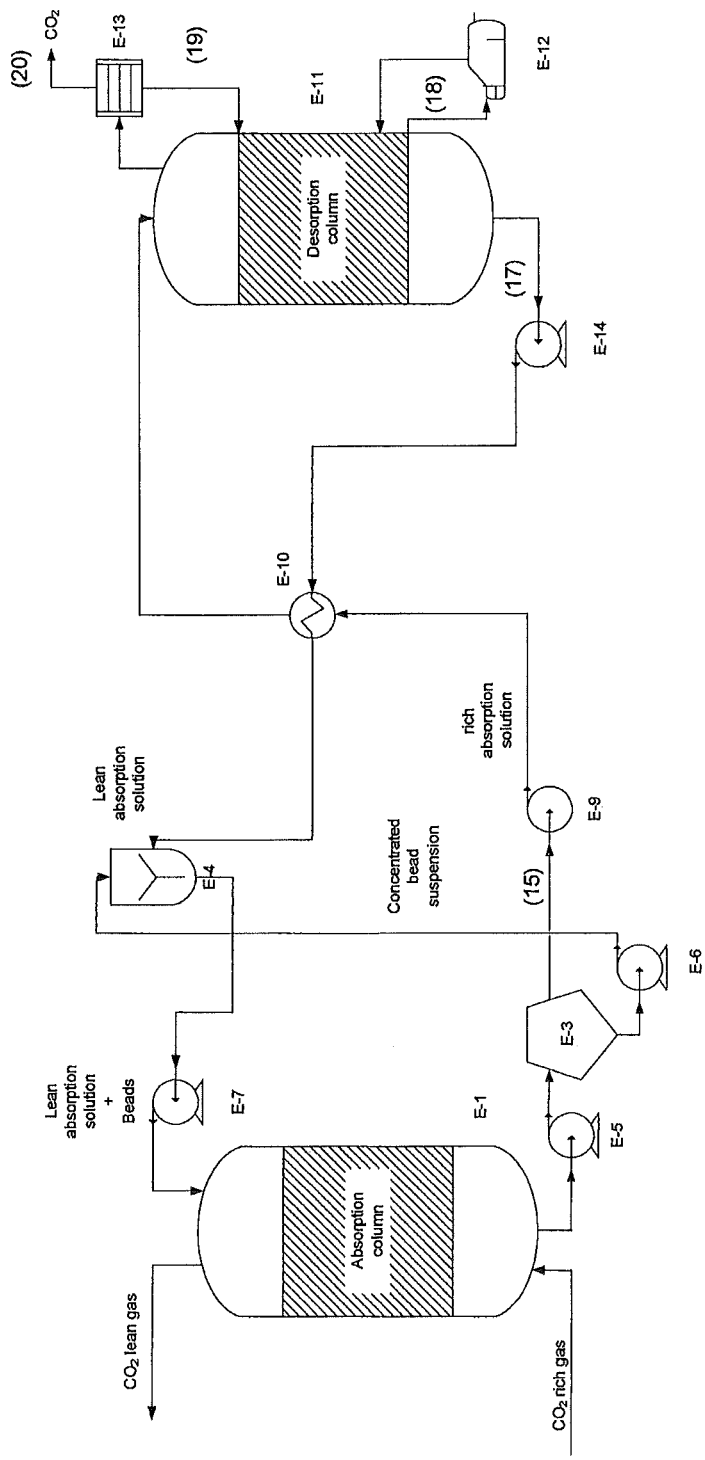
FIG. 2 is a process diagram of another embodiment of the present invention, wherein an absorption unit is coupled to a desorption unit and biocatalytic micro-particles flow in the absorption solution.
Figure 3:
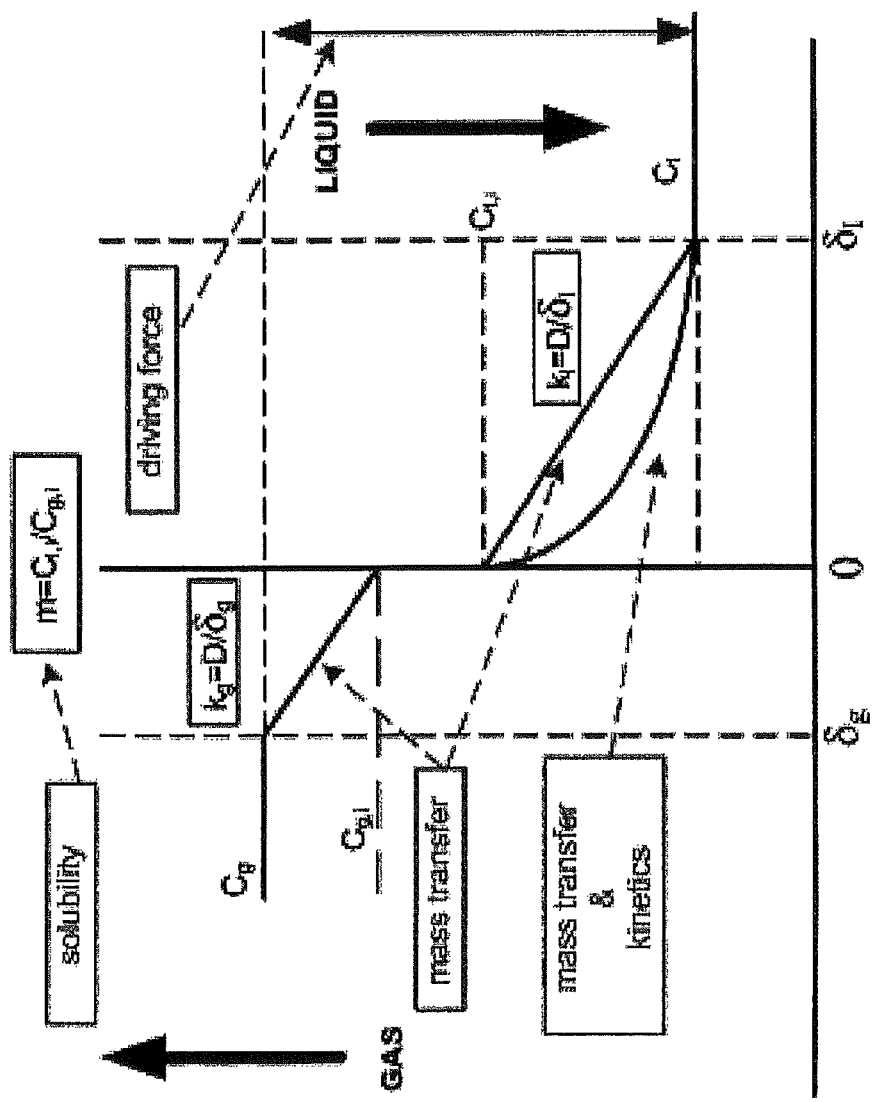
FIG. 3 is a schematic representation of the gas-liquid interface in absorption.

FIGS. 1 and 2 respectively show two different embodiments of the process and system of the present invention. It should also be understood that embodiments of the micro-particles of the present invention may be used in conjunction with the process and system.

In general, the process takes advantage of biocatalysts for gas scrubbing especially for $CO_2$ removal from a $CO_2$-containing effluent. In one embodiment, the process enables the use of immobilized biocatalysts, such as carbonic anhydrase, for $CO_2$ removal in a packed column. The carbonic anhydrase may be supported on the micro-particles within the formulation, by being directly bonded to the surface of the particle support material, entrapped inside or fixed to a porous support material matrix, entrapped inside or fixed to a porous coating material that is provided around a support particle that is itself porous or non-porous, or present as cross linked enzyme aggregates (CLEA) or cross linked enzyme crystals (CLEC) wherein the inner "support material" itself comprises an aggregate of enzymes and any other agents that may be used in the formation of CLEAs or CLECs, such as a crosslinker. The enzyme may be provided in CLEA or CLEC form, which may be provided on or around a different support material which may be magnetic or not. It should be understood that a combination of the above immobilisation techniques may be used to allow the biocatalytic micro-particles to flow in the absorption solution through the reactor, e.g. on, through and/or around packing material of a packed column.

The present invention provides a process for capturing $CO_2$ from a $CO_2$-containing gas. In one embodiment of the process, the first step comprises contacting the $CO_2$-containing gas with an absorption mixture comprising a liquid solution and micro-particles. The micro-particles comprise a support material and biocatalysts supported thereby. The micro-particles are provided such that the absorption mixture is pumpable. Preferably, the step of contacting the gas and liquid phases is conducted such that the micro-particles flow with the liquid solution, move within the liquid solution and move in and out of the bulk flow, to improve rapid convective mass transfer of the $CO_2$ reactant and the hydrogen and bicarbonate ion products.

This absorption step may be performed in a variety of reactors. Preferably, the absorption step is performed in a packed tower reactor. It may also be done in a spray tower or another type of reactor. In the case of a packed tower, the micro-particles flow downward by flowing with the liquid solution while colliding against and ricocheting off the packing. While the bulk flow of the micro-particles follows that of the liquid solution through the reactor, the collisions cause some micro-particles to change direction and speed so as to not move with the local flow of the liquid solution. This movement within the liquid solution may have linear and/or spinning components and enables rapid convective mass transfer of $CO_2$ to access the biocatalysts on the micro-particles. In addition, the micro-particles are preferably sized (along with density and shape) to enable them to be carried with the bulk flow of the liquid solution and to be present in the thin reactive film between gas and liquid phases. It should be understood that such micro-particles may completely or partially break free of the bulk flow. Such broken-free micro-particles may have a particularly thin liquid film coating enabling rapid penetration by $CO_2$. These micro-particles allow the bicarbonate and hydrogen ions formed in the thin liquid film to rapidly disperse into the bulk liquid solution.

In another embodiment, the reactor may be a spray reactor. The micro-particles may be deflected or caused to move out of the bulk flow due to the cross-current, co-current or counter-current flow, incident spray nozzles, other micro-particles and pure liquid droplets, the side walls of the reactor, other objects that may be provided in reactor, etc., as desired. The spray reactor may be a vertical spray tower or a horizontal duct type. The spray reactor may be baffled or free of obstructions between the spray nozzles and a demister at the opposed end. It will be understood that the bulk flow of the liquid solution may be relatively large droplets or conglomerations of droplets sprayed or formed in the spray tower. The reactor is configured so that at least a film of liquid surrounds the micro-particles to avoid drying and denaturing the biocatalysts. In operation, when the micro-particles are sprayed into such a reactor, some micro-particles may be present as single free particles with a thin liquid film while others are present as a plurality of particles within individual droplets, depending on the size of the inlet nozzles, the size of the micro-particles, the liquid and gas flow conditions, among other operating parameters. The thin liquid film surrounding the micro-particles allows rapid diffusion of the $CO_2$ to access the biocatalysts as well as liquid replacement from movement through the humid reactor and collisions with droplets and other micro-particles. The reactor may be designed to have various nozzles for spraying. The micro-particles used in spray reactors enable increased surface area and rapid mass transfer as the micro-particles move through the humid mist environment. The micro-particles may be sized, for example, to be carried within the absorption mixture in the form of an atomized mist. The size, density, shape or porosity of the micro-particles may be managed to help increase surface area, increase biocatalyst activity, ensure the biocatalysts stay moist or improve the movement of the micro-particles relative to the $CO_2$-containing gas to increase mass transfer.

In another embodiment, the reactor may be a fluidized bed reactor. The micro-particles may be provided in order to flow through the fluidized bed to avoid being retained therein.

The size of the composite micro-particles may depend on the type of reactor, the process conditions, the density and shape of the support material. The density may be chosen based on the desired catalytic activity or the separation of the micro-particles from the solution, or both. The density may be about 0.6 to about 3 g/ml. For instance, nylon supports may have a density of about 1.1, cellulose supports may have a density of about 1.6 and magnetic supports may have a density of about 2.5. The density of the micro-particles may also be selected depending on the type of separation technique that is used to remove the micro-particles after the absorption stage, as the case may be. For instance, if the micro-particles are denser than water, then certain separation methods may be advantageous. The density of the micro-particles may also be selected to enhance the absorption process itself depending on the operating conditions and the type of reactor that is used. For example, if it is desired to avoid sinking the micro-particles may have a density similar to the density of the absorption mixture or ion-rich mixture, as desired. The effect of density will also be appreciated in light of some of the examples presented hereinbelow. The shape of the micro-particles may also be chosen based on the rheological effects and the available surface area of the micro-particles, as will also be appreciated in light of some of the examples presented hereinbelow.

In one optional aspect of the present invention, the particle concentration and particle size are managed along with the enzyme activity in a given solution. The particle concentration required to reach a given level of enzyme activity in a solution is a parameter that impacts the particle size. If the particle concentration is too high, it may result in an absorption mixture that is difficult or impossible to be pumped through a packed bed or spray reactor system. In this regard, to have in the solution the same enzyme activity as 1 g/L of soluble carbonic anhydase (CA), results have demonstrated that for 350 μm polymeric micro-particles with CA fixed at their surface, with an activity density of 0.51 Wilbur-Anderson.unit/mm$^2$ (WA/mm$^2$), the corresponding particle concentration is about 60% (w/w), which is too high to be pumped. In order to reduce the particle concentration under a preferred level of 30% (w/w), which is equivalent to 300 g/L for particles with density near 1, the 350 μm micro-particles must be either modified such that they provide a higher activity density or reduced in size. For example, given the same activity density of 0.51 unit WA/mm$^2$ and the same activity equivalent to 1 g/L soluble CA, using micro-particles with a diameter of 50 μm would result in a particle concentration of 90 g/L (or 9% w/w), a pumpable absorption mixture. More regarding the particle size and concentration will be discussed hereinbelow with regard to a calculation method and the impact of various parameters.

In another optional aspect of the present invention, the particle size of the micro-particles is chosen according to the thickness of the reactive film in the given solution. The thickness of the reactive film depends on certain factors including the type of absorption solution and the gas being absorbed. In one aspect, considering most commonly used $CO_2$ absorption solutions, the reactive film has a thickness of about 10 μm.

Referring to FIG. 3, a schematic representation of the gas liquid interface in an absorption unit is shown. In this absorption unit, the gas phase flows upward and liquid phase downward. Mass transfer between the two phases takes place in the gas film (thickness of δg) and the liquid film (thickness of δl). For $CO_2$ absorption, resistance to mass transfer is in the liquid phase. In conventional absorption solutions, the thickness of liquid film at the surface of the packing is several millimeters. However, the thickness of the reactive liquid film where the mass transfer and reactions between $CO_2$ and the solution take place (δl) is about 10 μm. Thus, to take the best advantage of the enzyme, it is preferably present in this reactive liquid film. Possible ways to reach this is by using soluble enzyme or by using enzyme micro-particles with small diameters. For comparison, enzyme immobilized to large fixed packing, which is at the surface of the packing material, is several millimeters away from the gas liquid interface and the reactive liquid film and its impact is thus relatively lower.

To take advantage of the effects associated with such reactive film thicknesses, the micro-particles may be sized such that the diameter is within about an order of magnitude as the film thickness, preferably smaller than the film thickness. In one instance where the reactive film has a thickness of about 10 μm, the micro-particles may be sized between about 1 μm and about 100 μm, preferably between about 1 μm and about 10 μm, still preferably below about 10 μm, preferably below about 5 μm. In another embodiment, the lower limit of the micro-particle size is chosen based upon the desired micro-particle separation method, such as filtration. Micro-particles of a certain size may be more easily separated from the ion-rich mixture using some separation methods while remaining small enough to achieve the desired catalytic activity.

One embodiment of the process and system is shown in FIG. 1 and will be described in further detail hereafter. First, the biocatalytic micro-particles are mixed in the lean absorption solution in a mixing chamber (E-4). The lean absorption solution refers to the absorption solution characterized by a low concentration of the species to be absorbed. This solution is either fresh solution or comes from the mineral carbonation process or the $CO_2$ desorption process (10). The absorption solution with biocatalytic particles (11), also referred to as the absorption mixture, is then fed to the top of a packed column (E-1) with a pump (E-7). The packing material (9) may be made of conventional material like polymers, metal and ceramic. The geometry of the packing may be chosen from what is commercially available. It is also possible to chose or arrange the packing to promote certain deflections and collisions with the micro-particles, or to avoid accumulation of the micro-particles within the reactor. For instance, the packing preferably has limited upward facing concavities to avoid the accumulation of micro-particles therein. Also preferably, the packing supports are much larger than the micro-particles. Also preferably, the micro-particles and packing are chosen so that the micro-particles can flow through the reactor without clogging. Counter-currently, a $CO_2$ containing gas phase (12) is fed to the packed column (E-1) and flows on, through and/or around the packing (9) from the bottom to the top of the column. The absorption solution and biocatalytic micro-particles flow on, through and/or around the packing material (9) from the top of the column to the bottom. As the absorption solution and biocatalytic micro-particles progress through the absorber, the absorption solution becomes richer in the compound that is being absorbed. Biocatalytic micro-particles, present near the gas-liquid interface, enhance $CO_2$ absorption by immediately catalyzing the $CO_2$ hydration reaction to produce bicarbonate ions and protons and thus maximizing the $CO_2$ concentration gradient across the interface. At the exit of the column, the rich absorption solution and biocatalytic micro-particles (13) are pumped (E-5) to a particle separation unit (E-3). Rich absorption solution refers to the absorption solution characterized by a concentration of absorbed compound which is higher than that of the lean solution. The separation unit may comprise a filtration unit (such as a tangential filtration unit), a centrifuge, a cyclone, a sedimentation tank or a magnetic separator and any other units or equipments known for particle or solid separation. The separation unit also enables a certain quantity of solution to be retained with the micro-particles so the particles do not dry out which can denature the biocatalysts. In one optional aspect, the quantity of retained solution enables the micro-particles to be pumped to a storage unit or directly back to a mixing chamber (E-4) for addition into the absorption unit. In another optional aspect, the micro-particles with retained solution may be gravity fed into the mixing chamber (E-4), which may be enabled by performing separation above the mixing unit, for example. The separation may be conducted in continuous or in batch mode, and may be managed to ensure the proper amount of solution is retained to ensure enzyme activity. It may also be preferred that the micro-particles are provided such that they may be easily separated from any solid precipitates (e.g. bicarbonate precipitates) that may be entrained in the ion-rich solution, if need be. The absorption solution without micro-particles (15) is then pumped (E-9) to another unit which may be a $CO_2$ desorption unit or a mineral carbonation unit (10). Biocatalytic micro-particles (16) are mixed with the $CO_2$ lean absorption solution. This suspension is then fed once again to the absorption column (E-1).

In another embodiment, the absorption unit is coupled to a desorption unit as shown in further detail in FIG. 2. In this embodiment, the absorption solution rich in $CO_2$ without biocatalytic micro-particles (15) is pumped (E-9) through a heat exchanger (E-10) where it is heated and then to the desorption column (E-11). In the desorption unit, the solution is further heated in order that the $CO_2$ is released from the solution in a gaseous state. Because of relatively high temperature used during desorption, water also vaporizes. Part of the absorption solution (18) is directed toward a reboiler (E-12) where it is heated to a temperature enabling $CO_2$ desorption. Gaseous $CO_2$ together with water vapour are cooled down, water condenses and is fed back to the desorption unit (19). Dry gaseous $CO_2$ (20) is then directed toward a compression and transportation process for further processing. The liquid phase, containing less $CO_2$, and referred to as the lean absorption solution (17) is then pumped (E-14) to the heat exchanger (E-10) to be cooled down and fed to the mixing chamber (E-4). The temperature of the lean absorption solution (17) should be low enough not to denature the enzyme if present.

The biocatalysts can be supported on the support material in any of the ways described hereinabove and such micro-particles are mixed in the absorption solution and flow downward on, through and/or around the packing of the packed column. Counter-currently, the gas containing $CO_2$ flows on, through and/or around the packing and contacts the absorption solution with the biocatalytic micro-particles.

In one optional aspect of the invention, an advantage of having micro-particles with biocatalysts in the absorption solution is that the enzyme is brought into close contact with the gas phase, thus maximizing the $CO_2$ concentration gradient across the gas and liquid phases and consequently the $CO_2$ absorption rate. An advantage of this process is that the impact of immobilized biocatalysts can be greater because they are closer to the gas liquid interface. The performance is improved compared to a packed column without enzyme and with biocatalysts immobilised on the packing itself.

In another optional aspect of the invention, an advantage of providing micro-particles is that the quantity and activity of the enzyme may be designed and controlled for a given process, reactor, pumping requirements, or set of conditions.

In another optional aspect of the invention, an advantage is that immobilization of the biocatalysts as part of micro-particles may provide increased stability to the enzyme. More regarding stability will be described below. The micro-particles with immobilised biocatalysts may have a longer shelf life for storage, shipping, reutilisation, and recycling within the process as the biocatalysts are stabilised on the support material. In some embodiments, the immobilized biocatalysts may become stable to operation conditions in process units other than the absorption unit, such as the desorption unit, and consequently micro-particles could be used in the absorption and desorption units without the need to remove the micro-particles prior to the desorption unit. In such a process configuration the enzymatic micro-particles may have an impact in the absorption unit by increasing the $CO_2$ absorption rate but also in the desorption unit since carbonic anhydrase is also known to increase rate of bicarbonate ion transformation into $CO_2$ (which is one of the reactions that would take place in the desorption unit). In this configuration, the removal unit (E-3) would be required to remove deactivated micro-particles and unit (E-4) to add fresh enzymatic micro-particles. However, it may be advantageous to have a separation unit such as a filter between (E-11) and (E-12) to avoid flow of the enzymatic micro-particles through the reboiler and their contact with very high temperatures (depending on the thermoresistance of the biocatalysts of the micro-particles).

In another optional aspect of the invention, an advantage is that the micro-particles can be easily replaced or refurbished. The mixing chamber (E-4) preferably comprises an inlet for receiving recycled micro-particles from the separation unit (E-3) and also an inlet/outlet for both removing a fraction of used micro-particles and replacing them with new micro-particles, thereby refurbishing the overall batch of micro-particles in the system.

In another optional aspect of the invention, an advantage of the process and system is that the micro-particles can be removed from the ion-rich mixture far easier than conventional free enzymes. By way of example, human carbonic anhydrase type II is an ellipsoid with dimensions of 39 Å×42 Å×55 Å and is difficult to separate from solution. Thus, the micro-particles can be sized to enable both high absorption rate and easy removal for recycling. In this way, the enzymes can avoid being present in the desorption unit which can involve high temperatures and other conditions that can denature some types of enzymes and enzyme variants. In some embodiments, the biocatalytic micro-particles are filtered, centrifuged, cycloned, sedimented or separated magnetically in a first separation unit and other small particles such as precipitates can be separated in a preceding or subsequent separation unit.

The process/system may comprise a separation unit for removal of the micro-particles. These micro-particles are then preferably pumped back to the inlet of the absorption liquid in the packed column. The selection of the separation unit depends on the size of micro-particles, density, cost and on their nature (e.g. magnetic or non magnetic particles) The process may also comprise a desorption unit in order to regenerate the ion-rich solution.

In one embodiment, the micro-particles are used in conjunction with an absorption compound in the solution. The absorption compound may be primary, secondary and/or tertiary amines (including alkanolamines); primary, secondary and/or tertiary amino acids; and/or carbonates. The absorption compound may more particularly include amines (e.g. piperidine, piperazine and derivatives thereof which are substituted by at least one alkanol group), alkanolamines (e.g. monoethanolamine (MEA), 2-amino-2-methyl-1-propanol (AMP), 2-(2-aminoethylamino)ethanol (AEE), 2-amino-2-hydroxymethyl-1,3-propanediol (Tris), N-methyldiethanolamine (MDEA), dimethylmonoethanolamine (DMMEA), diethylmonoethanolamine (DEMEA), triisopropanolamine (TIPA) and triethanolamine), dialkylether of polyalkylene glycols (e.g. dialkylether or dimethylether of polyethylene glycol); amino acids which may include potassium or sodium salts of amino acids, glycine, proline, arginine, histidine, lysine, aspartic acid, glutamic acid, methionine, serine, threonine, glutamine, cysteine, asparagine, valine, leucine, isoleucine, alanine, valine, tyrosine, tryptophan, phenylalanine, and derivatives such as taurine, N, cyclohexyl 1,3-propanediamine, N-secondary butyl glycine, N-methyl N-secondary butyl glycine, diethylglycine, dimethylglycine, sarcosine, methyl taurine, methyl-α-aminopropionic acid, N-(β-ethoxy)taurine, N-(β-aminoethyl)taurine, N-methyl alanine, 6-aminohexanoic acid; and which may include potassium carbonate, sodium carbonate, ammonium carbonate, promoted potassium carbonate solutions and promoted sodium carbonate solutions or promoted ammonium carbonates; or mixtures thereof. Absorption compounds are added to the solution to aid in the $CO_2$ absorption and to combine with the catalytic effects of the carbonic anhydrase. Due to the structure or high concentration of some absorption compounds, the activity or longevity of the carbonic anhydrase can be threatened. For instance, free enzymes may be more vulnerable to denaturing caused by an absorption compound with high ionic strength such as carbonates. Immobilising the carbonic anhydrase can mitigate the negative effects of such absorption compounds. By providing the carbonic anhydrase immobilised or otherwise supported by micro-particles, the process can yield high $CO_2$ transfer rates in the presence of absorption compounds while mitigating the negative effects such compounds could otherwise have on free enzymes.

EXAMPLES

Example 1

The micro-particle support material may be made of nylon, silica, silica gel, chitosan, polystyrene, polymethylmetacrylate, cellulose, magnetic particles, and other material known to be used for biocatalysts immobilization. The micro-particles may also be composed of a combination of different materials. For instance, the support may have a core composed of a material having different density or other properties compared to a different surface material which is provided for immobilization or entrapment of the enzymes. For example, the core of the support may be composed of a magnetic material to enable magnetic separation and the surface material may be polymeric such as nylon for supporting the enzyme. As noted above, in one embodiment the support material may be an aggregate of enzymes to form CLEA or CLEC. The micro-particles may each define an integral solid volume (e.g. a bead-like shape) or may comprise one or more apertures traversing the main volume of the particle (e.g. a pipe or donut shape). By way of example, the micro-particles may be ovoid, spherical, cylindrical, etc.

The micro-particles may be sized in accordance with the requirements of given process conditions. For higher sizes, the compounds, materials and process equipment should be chosen to allow sufficient flow and pumpability of the absorption mixture. More regarding sizing will be discussed hereinbelow.

Example 2

An experiment was conducted in an absorption packed column. The absorption solution is an aqueous solution of methyldiethanolamine (MDEA) 4M. This absorption solution is contacted counter-currently with a gas phase with a $CO_2$ concentration of 130,000 ppm. Liquid flow rate was 0.65 g/min and gas flow rate was 65 g/min corresponding to UG of 10 (g/g). Gas and absorption solution were at room temperature. Operating pressure of the absorber was set at 1.4 psig. The column has a 7.5 cm diameter and a 50 cm height. Packing material is polymeric Raschig rings 0.25 inch. Three tests were performed: the first with no activator, the second with carbonic anhydrase immobilized to packing support and the third using carbonic anhydrase free in solution at a concentration of 0.5 g per liter of solution.

The results obtained showed that $CO_2$ transfer rate or $CO_2$ removal rate increased from 6 to 14 mmol $CO_2$/min with carbonic anhydrase immobilized onto the surface of Raschig rings. In the presence of free enzyme i.e. carbonic anhydrase free flowing in the solution, the transfer rate increased to 29 mmol/min. These results demonstrate the positive impact of adding the enzyme in a packed column and that micro-particles comprising enzymes can enable improvements.

Similar tests were also performed with solutions of potassium carbonate (20% w/w-1.45 M)) and sodium carbonate 0.5 M. The impact of free and immobilized enzyme follows the same trend as for MDEA 4 M.

Example 3

To further determine the impact of enzymatic micro-particles on $CO_2$ absorption rate, tests were conducted in a hydration cell. This hydration cell reactor was designed and operated at set conditions to control the area of the interface between a gas phase, $CO_2$, and a liquid phase in an absorption process. This device was used to evaluate impact of enzymatic micro-particles on the $CO_2$ absorption rate in a given absorption solution. Tests were conducted as follows: a known volume of the unloaded absorption solution is introduced in the reactor; then a known mass of micro-particles is added to the absorption solution (micro-particles may or may not contain enzyme); a $CO_2$ stream is flowed through the head space of the reactor and agitation is started; pH of the solution is measured as a function of time; then pH values are converted into carbon concentration in g C/L using a carbon concentration-pH correlation previously determined for the absorption solution; absorption rates are determined from a plot of C concentration as a function of time. The impact of the enzyme as a relative absorption rate is reported: ratio of absorption rate in the presence of the enzyme micro-particles to absorption rate in the presence of micro-particles without enzyme. It should be noted that results obtained in hydration cell reactor cannot be directly compared to those obtained in a packed column because hydrodynamic conditions and mass transfer coefficients are different.

Example 4

Tests were conducted with the enzyme human carbonic anhydrase type II (HCAII) immobilised at the surface of nylon micro-particles. It should be noted that these tests used a non optimised immobilization protocol and thus the activity of the enzymes could be increased by adjusting the immobilization protocol. Nylon micro-particles size ranges from 50-160 µm. Absorption solutions that were tested were 1.45 M $K_2CO_3$ and 0.5 M $Na_2CO_3$. Testing temperature was 20° C. Methodology was as described in Example 3. Results indicate that $CO_2$ absorption rate was increased by 20-30% for both solutions as compared to micro-particles with no enzymes.

Example 5

Tests were conducted with HCAII immobilised at the surface of nylon micro-particles. (using a non optimized immobilization protocol) Nylon micro-particles size ranges from 50-160 µm. Absorption solution was 2M MDEA. Testing temperature was 20° C. Enzyme concentrations ranged from 0.1 to 0.5 g/L. Methodology was as described in Example 3. Results indicate that enzyme on nylon micro-particles increases $CO_2$ absorption rate for all tested conditions (see Table 1). Absorption rate increased between 40 and 120%.

TABLE 1

Relative $CO_2$ transfer rates in presence of enzyme immobilized on nylon micro-particles in 2M MDEA solution

| Enzyme concentration (g/L) | Relative transfer rate |
|---|---|
| 0.1 | 1.4 |
| 0.25 | 1.4 |
| 0.5 | 2.2 |

Example 6

Tests were conducted with HCAII immobilised at the surface of cellulose micro-particles (using a non optimized immobilization protocol). Cellulose micro-particle size is 50 µm. Absorption solution was 2M MDEA. Testing temperature was 20° C. Enzyme concentrations in the solution ranged from 0.1 to 0.5 g/L. Methodology was as described in Example 3. Results indicate that enzyme on cellulose micro-particles increases $CO_2$ absorption rate for enzyme concentration higher than 0.1 g/L (see Table 2) under tested conditions.

TABLE 2

Relative $CO_2$ transfer rates in presence of enzyme immobilized on cellulose micro-particles in a 2M MDEA solution

| Enzyme concentration (g/L) of solution | Relative transfer rate |
|---|---|
| 0.1 | 1.0 |
| 0.25 | 1.1 |
| 0.5 | 1.6 |

Example 7

Tests were conducted with HCAII immobilised at the surface of nylon micro-particles (using a non optimized immobilization protocol). Nylon particle size ranges between 50 and 160 µm. Absorption solutions were 0.5 M of the potassium salt of the following amino acids: glycine, methionine, taurine and N,N-dimethylglycine. Testing temperature was 20° C. Enzyme concentration is 0.5 g/L. Methodology is as described in Example 3. Results indicate that enzyme on nylon micro-particles increases $CO_2$ absorption rate for all tested amino acid salts (see Table 3). However, the impact of the enzyme was less important for N,N-dimethylglycine, a tertiary amino acid.

TABLE 3

Relative $CO_2$ transfer rates in presence of enzyme immobilized on nylon micro-particles in 0.5M potassium salt of amino acids at an enzyme concentration of 0.5 g/L

| Amino acid | Relative transfer rate |
|---|---|
| Glycine | 1.4 |
| Methionine | 1.5 |
| Taurine | 1.6 |
| N,N-dimethylglycine | 1.1 |

Example 8

Tests were conducted with cross linked enzyme aggregates (CLEA) of carbonic anhydrase (using a non optimized protocol). The enzyme used is a thermoresistant variant of enzyme HCAII, designated as 5x. CLEA contains 26% (w/w) of the 5x enzyme. Particle size ranges between 4-9 µm. Absorption solution was 1.45 M $K_2CO_3$. Testing temperature was 20° C. Enzyme concentration was 0.5 g/L. Methodology is as described in Example 3. Tests were conducted with CLEAs and then with deactivated CLEAs as a reference to enable determination of the enzyme impact. Results indicate that CLEAs increases $CO_2$ absorption rate by a factor of 3.2.

Example 9

Tests were conducted with cross linked enzyme aggregates (CLEA) of carbonic anhydrase (using a non optimized protocol). The enzyme used is a thermoresistant variant of enzyme HCAII, designated as 5x, CLEA contains 26% (w/w) of the 5x enzyme. Particle size ranges between 4-9 µm. Absorption solution was 1M MDEA Testing temperature was 25° C. Enzyme concentration was 0.5 g/L. $CO_2$ absorption tests were performed in a stirred cell, a simple device that can be used to evaluate $CO_2$ absorption rates under different conditions. The stirred cell contains the absorption solution (and the enzyme when required). A known pressure of pure $CO_2$ is applied to the solution. In these tests, initial $CO_2$ pressure is 1 000 mbar. Then the pressure decrease is monitored and used to calculate $CO_2$ transfer rate in the absorption. Tests were conducted with particles with CLEAs and without CLEAs to enable determination of the enzyme impact. Results are expressed as a ratio of the $CO_2$ transfer rate with CLEAs to the $CO_2$ transfer rate in the absence of CLEAs. Results indicate that CLEAs increase $CO_2$ absorption rate by a factor of 1.3 to 1.7 in the MDEA.

Example 9

Tests were conducted with HCAII immobilised at the surface of magnetic silica coated iron oxide micro-particles (using a non optimized immobilization protocol). Particle size is 5 μm. Absorption solution was 1.45 M $K_2CO_3$. Testing temperature was 20° C. Enzyme concentration is 0.2 g/L. Methodology is as described in Example 3. Results indicate that enzyme on magnetic micro-particles increases $CO_2$ absorption rate by a factor of 1.6.

Example 10

This example provides calculations for the minimum activity density for a given micro-particle size, for an embodiment of the process.
Data:
Activity level to be reached in the absorption solution: $5 \times 10^6$ units/L (corresponding to 1 g/L soluble carbonic anhydrase).
Material density: 1.1 g/mL for nylon particles (~1 100 g/L).

Maximum allowable particle concentration: 300 g/L.
Particle diameter: 10 μm.
Calculations:
1. Surface of a 10 μm particle $$A_p = 4\pi \text{ (radius)}^2 = 4\pi (5)^2 = 314 \text{ μm}^2$$

2. Volume of a 10 μm particle $$V_p = 4/3\pi \text{ (radius)}^3 = 4/3\pi (5)^3 = 524 \text{ μm}^3$$

3. Total volume of particles per liter to reach the maximum allowable particle concentration:

$$\text{Total volume of particles}(V_T) = \frac{\text{Maximum particle mass per liter}}{\text{particle density}}$$

$$V_T = 300 \text{ g}/(1{,}100 \text{ g/L})$$
$$= 0.272 \text{ L (corresponding to } 2.72 \times 10^{14} \text{ μm}^3)$$

4. Number of particles ($n_p$) in 1 L of solution:

$$n_p = \frac{V_T}{V_p}$$

$$n_p = 2.72 \times 10^{14} \text{ μm}^3 / 524 \text{ μm}^3$$
$$= 5.21 \times 10^{11}$$

5. Total micro-particles surface area ($A_T$)

$$A_T = n_p * A_p = 5.21 \times 10^{11} * 314 = 1.64 \times 10^{14} \text{ μm}^2 \ (1.64 \times 10^8 \text{ mm}^2)$$

6. Minimum activity density
Activity density = Activity level/$A_T$ = $5 \times 10^6/1.64 \times 10^8$ = 0.03 Unit WA/mm$^2$ Thus, for 10 μm micro-particles, the minimum activity density to reach an activity level of $5 \times 10^6$ units WA/L, is 0.03 unit WA/mm$^2$.

Thus, if the activity density is higher than 0.03 unit WA/mm$^2$, a particle concentration lower than 300 g/L would be needed. Additional examples are shown in Table 4 below.

TABLE 4

Examples of minimum enzyme activity for given particle size scenarios

| Soluble enzyme concentration (g/L) for equivalency | Enzyme activity of soluble enzyme (Units WA/L) | Particle size (μm) | Surface of one particle ($A_p$) (μm$^2$) | Volume of one particle ($V_p$) (μm$^3$) | Maximum particle concentration (g/L) | Material density (g/mL) | Total volume of particles (μm$^3$) | Number of particles/L of solution | Total particle surface (μm$^2$) | Minimum activity density (Units WA/mm$^2$) |
|---|---|---|---|---|---|---|---|---|---|---|
| 1 | 5.00E+06 | 10 | 314.16 | 524 | 300 | 1.1 | 2.73E+14 | 5.21E+11 | 1.64E+08 | 0.031 |
| 1 | 5.00E+06 | 5 | 78.54 | 65 | 300 | 1.1 | 2.73E+14 | 4.17E+12 | 3.27E+08 | 0.015 |
| 1 | 5.00E+06 | 1 | 3.1416 | 1 | 300 | 1.1 | 2.73E+14 | 5.21E+14 | 1.64E+09 | 0.003 |
| 1 | 5.00E+06 | 20 | 1256.64 | 4189 | 300 | 1.6 | 1.88E+14 | 4.48E+10 | 5.63E+07 | 0.089 |
| 1 | 5.00E+06 | 10 | 314.16 | 524 | 200 | 1.6 | 1.25E+14 | 2.39E+11 | 7.50E+07 | 0.067 |
| 1 | 5.00E+06 | 5 | 78.54 | 65 | 200 | 1.6 | 1.25E+14 | 1.91E+12 | 1.50E+08 | 0.033 |
| 1 | 5.00E+06 | 1 | 3.1416 | 1 | 200 | 1.1 | 1.82E+14 | 3.47E+14 | 1.09E+09 | 0.005 |
| 1 | 5.00E+06 | 20 | 1256.64 | 4189 | 200 | 1.6 | 1.25E+14 | 2.98E+10 | 3.75E+07 | 0.133 |
| 0, 1 | 5.00E+05 | 10 | 314.16 | 524 | 300 | 3 | 1.00E+14 | 1.91E+11 | 6.00E+07 | 0.008 |
| 0, 1 | 5.00E+05 | 5 | 78.54 | 65 | 300 | 1.1 | 2.73E+14 | 4.17E+12 | 3.27E+08 | 0.002 |
| 0, 1 | 5.00E+05 | 1 | 3.1416 | 1 | 300 | 1.6 | 1.88E+14 | 3.58E+14 | 1.13E+09 | 0.000 |
| 0, 1 | 5.00E+05 | 20 | 1256.64 | 4189 | 300 | 3 | 1.00E+14 | 2.39E+10 | 3.00E+07 | 0.017 |
| 0, 1 | 5.00E+05 | 10 | 314.16 | 524 | 200 | 1.1 | 1.82E+14 | 3.47E+11 | 1.09E+08 | 0.005 |
| 0, 1 | 5.00E+05 | 5 | 78.54 | 65 | 200 | 1.6 | 1.25E+14 | 1.91E+12 | 1.50E+08 | 0.003 |
| 0, 1 | 5.00E+05 | 1 | 3.1416 | 1 | 200 | 3 | 6.67E+13 | 1.27E+14 | 4.00E+08 | 0.001 |
| 0, 1 | 5.00E+05 | 20 | 1256.64 | 4189 | 200 | 3 | 6.67E+13 | 1.59E+10 | 2.00E+07 | 0.025 |

Example 11

This example provides calculations for the maximum particle size for a given particle concentration, for an embodiment of the process.
Data:
Activity level to be reached in the absorption solution: $5 \times 10^6$ units/(corresponding to 1 g/L soluble carbonic anhydrase).

Activity density on particles: 0.51 unit/mm².
Material density: 1.1 g/mL for nylon particles (~1 100 g/L).
Maximum allowable particle concentration: 300 g/L.
Calculations:
1. Total surface area required to reach the activity level:

$$\text{Total surface area}(A_T) = \frac{\text{activity level}}{\text{activity density}}$$

$$A_T = 5 \times 10^6 \text{ units/L}/(0.51 \text{ unit/mm}^2)$$

$$= 9\,803\,922 \text{ mm}^2$$

2. Total volume of particles per liter to reach the maximum allowable particle concentration:

$$\text{Total volume of particles}(V_T) = \frac{\text{Maximum particle mass per liter}}{\text{particle density}}$$

$$V_T = 300 \text{ g}/(1\,100 \text{ g/L})$$

$$= 0.272 \text{ L(corresponding to } 272\,727 \text{ mm}^3\text{)}$$

So, a volume of 272 727 mm³ of particles would be present per liter of mixture.
3. Maximum radius of a particle:
For spherical particles:
$A_p = 4\pi (\text{radius})^2$
$V_p = 4/3 \pi (\text{radius})^3$
Thus:

$$\frac{A_p}{V_p} = \frac{3}{\text{radius}}$$

And:

$$\text{radius} = 3 \times \frac{V_p}{A_p}$$

$$= 3 \times \frac{272\,727}{9\,803\,922}$$

$$= 0.083 \text{ mm(83 microns)}$$

Thus, the maximum size of a particle would have a diameter of about 166 μm. So, if micro-particles are of a smaller diameter, the resulting mixture or absorption solution will be pumpable.

This method can be used to evaluate the maximum particle size allowable for many conditions of activity level, activity density, particle density and maximum allowable to particle concentration. Table 5 below shows different scenarios and corresponding particle sizes.

TABLE 5

Examples of maximum particle size scenarios

| Soluble enzyme concentration (g/L) for equivalency | Enzyme activity of soluble enzyme (Units WA/L) | Activity density (Units WA/mm²) | Total surface area (mm²) | Material density (g/mL) | Maximum particle concentration (g/L) | Maximum volume of particles (mm³) | Maximum particle radius (mm) | Maximum particle diameter (μm) |
|---|---|---|---|---|---|---|---|---|
| 1 | 5.00E+06 | 0.51 | 9.80E+06 | 1.1 | 300 | 272 727 | 8.35E−02 | 167 |
| 2 | 1.00E+07 | 0.51 | 1.96E+07 | 1.1 | 300 | 272 727 | 4.17E−02 | 83 |
| 0, 1 | 5.00E+05 | 0.51 | 9.80E+05 | 1.1 | 300 | 272 727 | 8.35E−01 | 1669 |
| 1 | 5.00E+06 | 0.51 | 9.80E+06 | 1.6 | 300 | 187 500 | 5.74E−02 | 115 |
| 2 | 1.00E+07 | 0.51 | 1.96E+07 | 1.6 | 300 | 187 500 | 2.87E−02 | 57 |
| 0, 1 | 5.00E+05 | 0.51 | 9.80E+05 | 1.6 | 300 | 187 500 | 5.74E−01 | 1148 |
| 1 | 5.00E+06 | 1 | 5.00E+06 | 1.1 | 300 | 272 727 | 1.64E−01 | 327 |
| 1 | 5.00E+06 | 1 | 5.00E+06 | 1.6 | 300 | 187 500 | 1.13E−01 | 225 |
| 1 | 5.00E+06 | 1 | 5.00E+06 | 3 | 300 | 100 000 | 6.00E−02 | 120 |
| 1 | 5.00E+06 | 0.51 | 9.80E+06 | 1.1 | 400 | 363 636 | 1.11E−01 | 223 |
| 1 | 5.00E+06 | 0.51 | 9.80E+06 | 1.6 | 400 | 250 000 | 7.65E−02 | 153 |
| 1 | 5.00E+06 | 0.51 | 9.80E+06 | 3 | 400 | 133 333 | 4.08E−02 | 82 |
| 1 | 5.00E+06 | 0.51 | 9.80E+06 | 1.1 | 200 | 181 818 | 5.56E−02 | 111 |
| 1 | 5.00E+06 | 0.51 | 9.80E+06 | 1.6 | 200 | 125 000 | 3.83E−02 | 77 |
| 1 | 5.00E+06 | 0.51 | 9.80E+06 | 3 | 200 | 66 667 | 2.04E−02 | 41 |

While the calculations in the above Examples are for spherical micro-particles, corresponding calculations or estimations may be performed for other micro-particle geometries.

Example 12

An experiment was conducted in an absorption packed column. The absorption solution is an aqueous solution of potassium carbonate ($K_2CO_3$) 1.45 M. This absorption solution is contacted counter-currently with a gas phase with a $CO_2$ concentration of 130,000 ppm. Liquid flow rate was 0.60 g/min and gas flow rate was 60 g/min corresponding to L/G of 10 (g/g). Gas and absorption solution were at room temperature. Operating pressure of the absorber was set at 1.4 psig. The column has a 7.5 cm diameter and a 50 cm height. Packing material is polymeric Raschig rings 0.25 inch. Two tests were performed: the first with no activator, the second with CLEAs containing 26% (w/w) of the 5× enzyme. Particle size ranged between 4-9 μm. The enzyme concentration in the absorption solution was 0.1 g/L.

The results obtained showed that $CO_2$ transfer rate was increased by a factor of 2.7 as the $CO_2$ removal rate went from 11 to 30 mmol/min with the CLEAs.

Example 13

Figure 4:
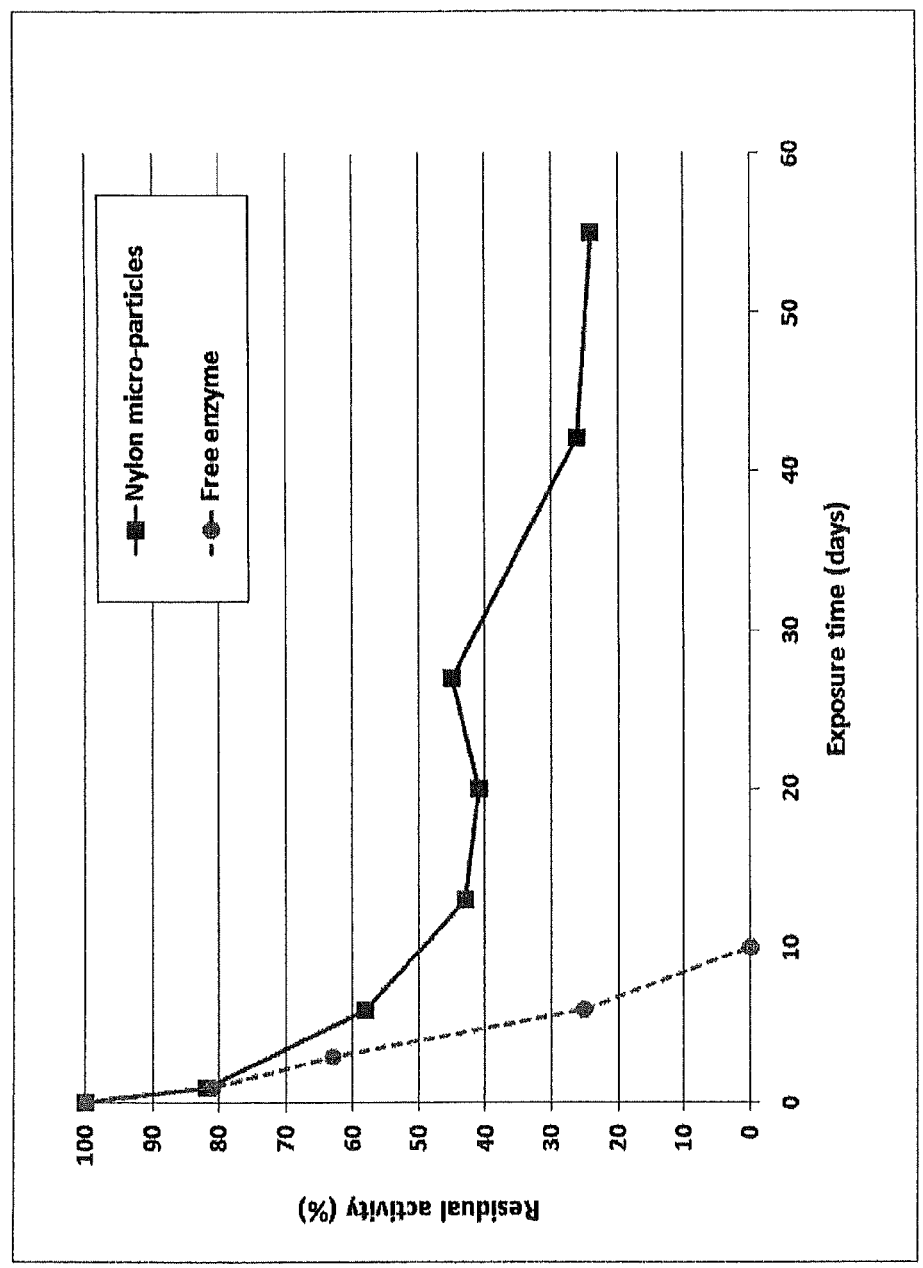
FIG. 4 is a graph showing evolution of residual activity of enzyme micro-particles exposed to MDEA 2M at 40° C., illustrating stability effect.

This example provides data to demonstrate that enzyme immobilization increases enzyme stability. Data are shown for enzyme immobilized on nylon micro-particles. To evaluate the impact of immobilization on enzyme stability, the stability of immobilized enzymes was evaluated and compared to the stability of the same enzyme in a soluble form. The micro-particles were prepared through the following non-optimized steps:

Surface treatment of nylon micro-particles with glutaraldehyde
Addition of polyethyleneimine
Addition of glutaraldehyde
Enzyme fixation (human carbonic anhydrase type II)
Aldehyde group blocking with polyethyleneimine Following immobilization, the enzyme micro-particles and soluble enzyme were exposed to MDEA 2M at 40° C. At specific exposure times, samples were withdrawn and activity was measured. Results are expressed as residual activity, which is the ratio of the activity of the enzyme at a given exposure time t to the enzyme activity at time 0. FIG. 4 illustrates the results.

Results show that free enzyme loses all activity with 10 days, whereas micro-particles still retain 40% residual activity after 56 days. From this result, it is clear that immobilization increases enzyme stability under these conditions.

These results show the potential of immobilization to increase the stability of carbonic anhydrase at higher temperature conditions that are found in a $CO_2$ capture process. In optional aspects of the present invention, the micro-particles enable increased stability of around or above the stability increase illustrated in the examples.

It should also be noted that the absorption and desorption units that may be used with embodiments of the present invention can be different types depending on various parameters and operating conditions. The units may be, for example, in the form of a packed reactor, spray reactor, fluidised bed reactor, etc., may have various configurations such as vertical, horizontal, etc., and the overall system may use multiple units in parallel or in series, as the case may be.

It should be understood that the embodiments described and illustrated above do not restrict what has actually been invented.

The invention claimed is:

1. A process for desorbing $CO_2$ gas from an ion-rich aqueous mixture comprising bicarbonate and hydrogen ions, comprising:
providing micro-particles in the ion-rich aqueous mixture;
feeding the ion-rich aqueous mixture with the micro-particles therein into a desorption reactor, wherein the desorption reactor comprises a packed reactor;
the micro-particles comprising a support material and biocatalysts supported and stabilized by the support material and being sized and provided in a concentration such that the ion-rich aqueous mixture containing the micro-particles flows through the packed reactor and the micro-particles are carried with the ion-rich aqueous mixture to promote transformation of the bicarbonate and hydrogen ions into $CO_2$ gas and water, thereby desorbing $CO_2$ gas from the ion-rich aqueous mixture.

2. The process of claim 1, wherein the micro-particles are sized to have a diameter above about 1 μm.

3. The process of claim 1, wherein the micro-particles are sized to have a diameter above about 5 μm.

4. The process of claim 1, wherein the micro-particles are sized to have a catalytic surface area comprising the biocatalysts having an activity density so as to provide an activity level equivalent to a corresponding activity level of soluble biocatalysts present in a concentration above about 0.05 g/L wherein the soluble biocatalysts have a minimum activity of about 260 WA units/mg.

5. The process of claim 1, wherein the micro-particles are sized to have a catalytic surface area comprising the biocatalysts having an activity density so as to provide an activity equivalent to a corresponding activity level of soluble biocatalysts present in a concentration between about 0.05 g/L and about 0.5 g/L wherein the soluble biocatalysts have a minimum activity of about 260 WA units/mg.

6. The process of claim 1, wherein the micro-particles have an activity density of at least about 0.06 $WA/mm^2$.

7. The process of claim 1, wherein the micro-particles are provided in the ion-rich aqueous mixture at a maximum particle concentration of about 40% w/w.

8. The process of claim 1, wherein the micro-particles are provided in the ion-rich aqueous mixture at a maximum particle concentration of about 30% w/w.

9. The process of claim 1, wherein the support material is at least partially composed of nylon, cellulose, silica, silica gel, chitosan, polystyrene, polymethylmetacrylate, magnetic material, or a combination thereof.

10. The process of claim 9, wherein the support material is composed of nylon.

11. The process of claim 1, wherein the density of the support material is between about 0.6 g/ml and about 3 g/ml.

12. The process of claim 1, wherein the density of the support material is above about 1 g/ml.

13. The process of claim 1, wherein the ion-rich aqueous mixture comprises water and further comprises an absorption compound.

14. The process of claim 13, wherein the absorption compound comprises primary, secondary and/or tertiary amines; primary, secondary and/or tertiary alkanolamines; primary, secondary and/or tertiary amino acids; and/or carbonates.

15. The process of claim 13, wherein the absorption compound comprises piperidine, piperazine, derivatives of piperidine or piperazine which are substituted by at least one alkanol group, monoethanolamine (MEA), 2-amino-2-methyl-I-propanol (AMP), 2-(2-aminoethylamino)ethanol (AEE), 2-amino-2-hydroxymethyl-I,3-propanediol (Tris), N-methyldiethanolamine (MDEA), dimethylmonoethanolamine (DMMEA), diethylmonoethanolamine (DEMEA), triisopropanolamine (TIPA), triethanolamine, dialkylether of polyalkylene glycols, dialkylether or dimethylether of polyethylene glycol, amino acids comprising glycine, proline, arginine, histidine, lysine, aspartic acid, glutamic acid, methionine, serine, threonine, glutamine, cysteine, asparagine, valine, leucine, isoleucine, alanine, valine, tyrosine, tryptophan, phenylalanine, and derivatives such as taurine, N,cyclohexyl 1,3-propanediamine, N-secondary butyl glycine, N-methyl N-secondary butyl glycine, diethylglycine, dimethylglycine, sarcosine, methyl taurine, methyl-a-aminopropionic acid, N-(β-ethoxy)taurine, N-(β-aminoethyl)taurine, N-methyl alanine, 6-aminohexanoic acid and potassium or sodium salts of the amino acids; potassium carbonate, sodium carbonate, ammonium carbonate, promoted potassium carbonate solutions and promoted sodium carbonate solutions or promoted ammonium carbonates; or mixtures thereof.

16. The process of claim 1, wherein the biocatalysts are enzymes.

17. The process of claim 16, wherein the enzymes are carbonic anhydrase.

18. The process of claim 17, wherein the carbonic anhydrase is immobilized on a surface of the support material of the microparticles, entrapped within the support material of the microparticles, or a combination thereof.

19. The process of claim 1, wherein the biocatalysts are carbonic anhydrase and the carbonic anhydrase is provided as cross-linked enzyme aggregates (CLEAs) and the support material comprises a portion of the carbonic anhydrase and crosslinker.

20. The process of claim 1, wherein the biocatalysts are carbonic anhydrase and the carbonic anhydrase is provided as cross-linked enzyme crystals (CLECs) and the support material comprises a portion of the carbonic anhydrase.

21. The process of claim 1, wherein prior to the step of providing the micro-particles in the ion-rich aqueous mixture, the process further comprising: selecting a desired biocatalytic activity level of the micro-particles; selecting a maximum allowable particle concentration for the desorption reactor; determining a total surface area required to reach the biocatalytic activity level; determining a total volume of the micro-particles to reach the maximum allowable particle concentration; and determining a maximum size of the micro-particles to achieve the biocatalytic activity level with the maximum allowable particle concentration.

* * * * *